Dec. 12, 1933. A. CURIONI Re. 19,026

VAPORIZING APPARATUS

Original Filed Aug. 1, 1930 2 Sheets-Sheet 1

INVENTOR
Aldo Curioni,
BY
Redding, Grubb, O'Shea & Campbell
HIS ATTORNEYS

Dec. 12, 1933. A. CURIONI Re. 19,026

VAPORIZING APPARATUS

Original Filed Aug. 1, 1930 2 Sheets-Sheet 2

INVENTOR
Aldo Curioni,
BY
Redding, Greley, O'Shea & Campbell
HIS ATTORNEYS

Reissued Dec. 12, 1933

Re. 19,026

UNITED STATES PATENT OFFICE 19,026

VAPORIZING APPARATUS

Aldo Curioni, Larchmont, N. Y., assignor, by mesne assignments, to The Gasolaire Corporation, New York, N. Y., a corporation of New York Original No. 1,882,318, dated October 11, 1932, Serial No. 472,302, August 1, 1930. Application for reissue June 9, 1933. Serial No. 675,112

14 Claims. (Cl. 261—15)

This invention relates to devices for gasifying volatile liquid fuels and more particularly refers to improvements in devices for producing combustible gas from volatile liquid fuels, adapted for use in connection with ordinary gas burners, such as are found in gas stoves and like appliances.

In a patent for Vaporizer, issued to me July 8, 1930, Patent No. 1,770,127, I have described and claimed a device of the character specified, consisting of a gas generating apparatus, adapted to be set directly on top of a fuel supply tank, forming a unit therewith. The gas generating unit proper comprises means, such as a fan, for producing a forced draft through and out of a vaporizing chamber, a pump forcing liquid fuel from a supply tank into the vaporizing chamber, means within the vaporizing chamber for percolating or otherwise distributing the fuel over a wide surface in the presence of the current of air supplied by the fan, and a motor for actuating both the pump and the fan.

In said device the vaporization of the fuel is chiefly effected by the air meeting the fuel while it percolates through a porous substance, the fuel vapors and the air, together forming a combustible gas, in sufficient volume and pressure to be directed to the consuming device through a pipe line.

The fuel thus supplied by the pump to the vaporizing chamber is not, as a rule, vaporized in its entirety, so that part of it, consisting chiefly of the heavier fractions, collects at the bottom of the vaporizing chamber and is returned therefrom to the supply tank.

I have found that by thus causing the heavy ends of a liquid fuel, which are less readily vaporized, to be returned to the liquid fuel supply tank, the quality of the fuel in the tank gradually deteriorates so that the generation of combustible gas becomes less and less effective.

The primary object of the present invention is to provide an apparatus which more effectively vaporizes the liquid fuel than has heretofore been done in existing devices and which likewise prevents the empoverishment of the fuel in the main supply tank; the heavier ends of the fuel being effectively prevented from returning to the supply tank and being returned to the vaporizing chamber immediately as collected, thus insuring the complete vaporization of the fuel.

Another object of the invention is to provide an improved vaporizing apparatus, in which a relatively small pump supply chamber, or pocket, is interposed between the main source of fuel supply and the pump, so as to serve as the immediate source of supply for said pump, said supply chamber also acting as a collecting chamber for the unvaporized portions of the fuel returning from the vaporizing chamber, and being arranged so as to insure their immediate return to said vaporizing chamber.

A further object of the invention is to provide, in a vaporizing apparatus of the character specified, a local source of heat, promoting vaporization of the fuel, said source of heat being preferably in the path of the air flowing through the vaporizing chamber and the outlet thereof to the distributing pipe line.

A still further object is to provide, in a vaporizing apparatus of the character specified, an electric source of heat, promoting the vaporization of the liquid fuel, its heating element proper being prevented from coming into actual contact with the combustible gas generated in the apparatus, said electric source of heat being for instance in the form of an easily procured and replaceable electric bulb, or bulbs.

An additional object is to provide a novel and improved vaporizing apparatus, adapted to be made complete in unitary form, said apparatus comprising means for supplying fuel to the vaporizing chamber, means for supplying air under pressure thereto, means for supplying heat to the vaporizing chamber and means for collecting and immediately rerouting through the system the unvaporized portions of the fuel returned from the vaporizing chamber.

Other objects and advantages of the present invention will more fully appear as the description proceeds and will be set forth and claimed in the appended claims.

My invention is illustrated by way of example in the accompanying drawings, in which.

Figure 1:
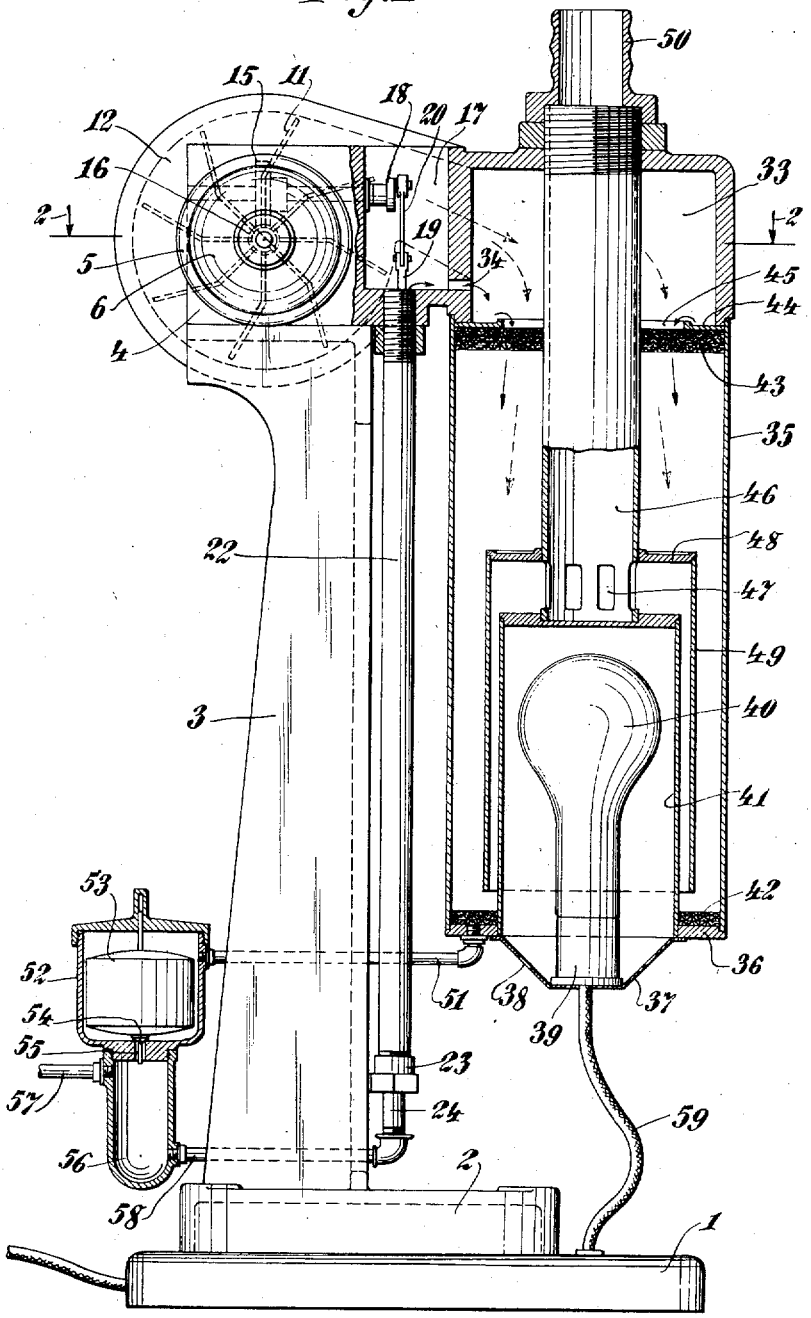
Fig. 1 is a view in side elevation, party broken away and in section, showing a device embodying my invention.
Figure 3:
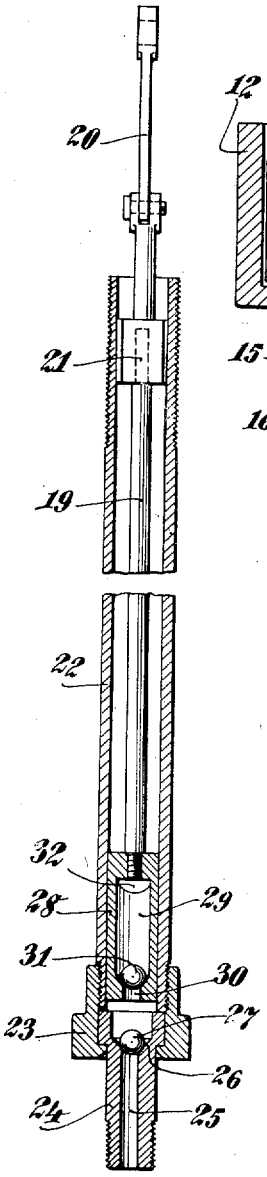
Fig. 3 is a view in longitudinal section, taken through the pump mechanism shown in Figs. 1 and 2.
Figure 2:
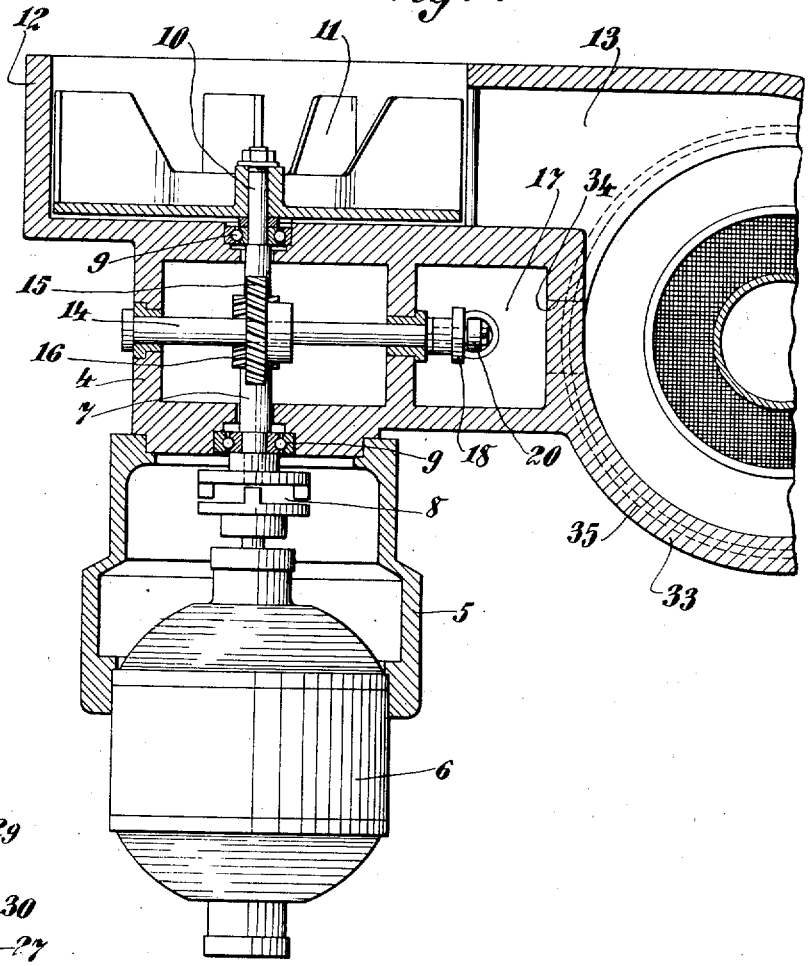
Fig. 2 is a view in section, taken on line 2—2 of Fig. 1, and looking in the direction of the arrows.

Referring to the above drawings, a suitable plate is shown at 1 for mounting a base 2 upon which a standard 3 is secured. This standard is formed with a head 4, to one side of which a motor supporting housing 5 is secured. An electric motor 6 is secured in the housing 5 and drives a shaft 7 through a suitable clutch mechanism 8. The shaft 7 is journaled in the sides of the head 4 and 9 and is formed with an overhang 10, upon which a fan 11 is mounted. The head of the standard 3 is formed with a fan housing 12 having a tangential duct 13 communicating therewith.

Likewise journaled within the head 4, but lying at right angles to the axis of shaft 7, is a shaft 14 provided with a worm wheel 15. This worm wheel is engaged by a worm 16 which is carried by the shaft 7 and thus the rotation of shaft 7 is imparted to shaft 14. A chamber 17 is formed adjacent the head 4 of the standard 3 and receives the projecting end of shaft 14. A suitable crank 18 is secured to the end of shaft 14 and drives a pump plunger 19 through a connecting rod 20. A bushing 21 on the plunger 19 restricts the movement of the latter to a truly restricted axial motion within a pump cylinder 22. The cylinder is preferably threaded into the bottom wall of chamber 17 to communicate therewith as clearly shown in Fig. 1.

The lower extremity of cylinder 22 is provided with a nut 23 which secures a fitting 24 to the lower extremity of the pump cylinder. This fitting is formed with an axial bore 25 and a check valve seat 26, upon which a ball check valve 27 normally seats. Upon the lower end of plunger 19, a piston 28 is secured, this piston being formed with an axial bore 29 and a restricted portion 30, upon which a ball check valve 31 rests. An aperture 32 is provided in the piston to afford a suitable communication between the pump cylinder and the axial bore 29 of the piston. The foregoing structure, it will be apparent, forms a pump mechanism, the purpose of which will be pointed out more fully hereinafter. It is preferred that the bushing 21 be formed with longitudinal grooves in order that the fluid pumped to the pump cylinder 22 may overflow the same and pass into the chamber 17.

Formed upon the head 4 is a manifold 33 which communicates with the duct 13. A suitable duct 34 provides the necessary communication between manifold 33 and the chamber 17, thus permitting the liquid in said chamber to flow into the manifold 33. Depending from the manifold is a tubular housing member 35 formed with a bottom plate 36 and a lamp mounting 37. The lamp mounting is preferably apertured at 38 and formed with a lamp base 39 within which an electric bulb 40 is mounted. A lamp housing 41 is secured to the bottom 36, the latter being preferably of annular profile and a suitable filter or flow retarding device 42 is mounted over the base.

Within the housing 35, a plurality of filters or flow retarding devices 43 are mounted, a plate 44 being positioned at the top of housing 35 and apertured at 45 to permit the fluid within the manifold to percolate downwardly through the filters 43.

A conduit 46 is axially mounted within the manifold 33 and extends downwardly, preferably being seated in the top of the lamp housing 41. Adjacent the lower extremity of the conduit 46 are a plurality of apertures 47, above which flange 48 is secured to the conduit. A downwardly depending cylindrical baffle 49 is secured to the periphery of flange 48 and directs the flow of the liquid and gasified fuel over a circuitous course before it reaches the apertures 47 and the gaseous fuel pipe 46.

A suitable fitting 50 is secured to the outlet of the pipe 46 to facilitate the connection of a suitable supply pipe or line to the apparatus and the manner in which liquid fuel is vaporized will be readily apparent from the above description. Fuel which is pumped through the pump cylinder 22 will overflow in the manifold 33 and percolate downwardly through the filters 43. Simultaneously, the fan 11 will direct a blast of air downwardly through the housing 35 and thus vaporize the liquid fuel, the vaporized fuel passing upwardly between the baffle 49 and the lamp housing 41, through the aperture 47 and into the supply pipe 46.

In accordance with one of the objects of this invention it is proposed to prevent the portions of the liquid fuel which have not been initially vaporized from being returned to the liquid fuel supply tank or source of liquid supply (not shown), which communicates with supply pipe 57. In furtherance of this idea, a relatively small pump supply or collecting chamber is interposed between fuel supply pipe 57 and suction pipe 58, leading to the pump cylinder through the intermediary of fitting 24. It will be observed that by virtue of this arrangement, chamber 56 constitutes the immediate source of liquid supply for the pump and that, since said chamber is relatively small, whatever liquid fuel collects therein, will be immediatey taken up by the pump and forced into chamber 17. Said chamber 56 also acts as a collecting chamber for the unvaporized fuel returned from the vaporizing chamber. To this end, a return pipe 51 is provided, which communicates with the housing 35, through the bottom plate 36.

I preferably provide a trap chamber 52 between return pipe 51 and pump supply chamber 56, said trap chamber receiving the fluid returned through pipe 51 and collecting the same temporarily. Within the chamber 52 is provided a float 53, formed with a valve 54 which seats over the entrance of a duct 55. Suction pipe 58 leads from the bottom of the chamber 56 to the pump fitting 24.

It will thus be seen that the heavy ends from the vaporizing chamber 35 will collect in the trap chamber 52 until the quantity thereof is sufficient to lift the float 53 and permit the same to flow into the pump supply chamber 56. From said chamber the suction pump immediately draws them into chamber 17, from which chamber they overflow into the vaporizing chamber and are finally vaporized. Their vaporization in this second stage is materially assisted by the fact that their temperature had already been raised during their previous passage from the vaporizing chamber.

The heat from bulb 40 materially aids in the vaporization of the fuel, particularly of the heavier ends, said bulb being preferably connected in the circuit with the motor 6, by a suitable wire 59.

It is, of course, within the scope of my invention to use some other form of electric heat generating means, but where the liquid fuel used is easily volatilized I prefer to use an electric bulb, or bulbs, because such a bulb is easily procured anywhere at small cost and because its filament is effectively protected from coming into direct contact with the combustible gas mixture; the danger of ignition or explosion is, therefore, avoided.

It will be observed that the air under pressure supplied by the fan and the fuel percolating through filter 43, are caused to travel through the chamber 35 in the same direction, so that the air has a chance to force the fuel through the filters and to effectively promote its complete vaporization; the action thereof being, of course, assisted by the heat generated by bulb 40 and by the circuitous course provided by baffle 49 and lamp housing 41.

It is to be understood that although I prefer to provide a trap device for temporarily collecting the unvaporized fractions before they are returned to the suction end of the pump, for the purposes of my invention it is not strictly necessary that this be done; since the basic idea consists in providing, in a vaporizing apparatus of the character specified, an arrangement whereby the unvaporized fractions of the fuel are redirected through suitable means to the vaporizing chamber immediately as collected, so as to prevent them from reaching the fuel tank. In other words, the heavy ends of the fuel are maintained in continuous circulation by the means directing the fuel to the vaporizing chamber until they are entirely vaporized.

The arrangement is such that when the unvaporized fractions reach chamber 56, that is in substance, the suction end of the pump, whatever liquid will be contained in chamber 56, including said fractions, will be sucked up by the pump in advance of any fresh fuel reaching the chamber 56 through supply pipe 57; the quality of the body of liquid constituting the source of supply will, therefore, remain unimpaired.

It is obvious that the function of the trap is not so much the collecting of heavy ends returning from the vaporizing chamber, as acting as a check valve for the return pipe 51, insuring at all times the effectiveness of the pump suction, said check valve being open only when there is some liquid in chamber 52, which should be admitted to the feed line for the pump. However, it is possible to conceive of other arrangements whereby the unvaporized fuel can be recirculated immediately as collected, without the use of a trap.

It must be understood that the immediate return of the unvaporized fractions to the vaporizing chamber, where they are finally vaporized, creates a condition whereby a substantial uniformity is reached in the grade of fuel supplied to the device, with minor fluctuations due to the momentary variations occurring in the proportion of heavy ends returned and new fuel supplied to the chamber. This is a very desirable condition, for it in its turn insures substantial uniformity in the intensity of the flame at the burner end.

In arrangements heretofore known, where the unvaporized fuel was allowed to return to the main source of supply, the quality of the fuel would gradually deteriorate and the quality of the gas generated would become poorer and poorer, until it would become necessary to remove the fuel and replace it with an entirely new supply. The arrangement is, therefore, advantageous from the standpoint of both performance and economy.

The inventive idea may be carried into practice in ways different from that shown; the drawings will, therefore, be understood as being intended for illustrative purposes only and not in a limiting sense. I, accordingly, reserve the right to carry my invention into practice in all those ways and manners which may enter, fairly, into the scope of the appended claims.

I claim:

1. A vaporizing device comprising a vaporizing chamber having a gas outlet, means to introduce a current of air into the chamber, whereby the flow thereof is directed out the outlet, a source of liquid supply, means to direct liquid into the chamber to be vaporized, means to collect liquid from the chamber and maintain the same separate from the source of liquid, and means to supply the collected liquid to the liquid directing means, whereby said collected liquid will be directly returned to the chamber by said directing means, preventing said collected liquid from becoming mixed with the body of liquid constituting the liquid supply.

2. A vaporizing device comprising a vaporizing chamber having a gas outlet, means to introduce a current of air into the chamber, whereby the flow thereof is directed out the outlet, a source of liquid supply, means to direct liquid into the chamber to be vaporized, means to collect liquid from the chamber and maintain the same separate from the source of liquid, and means to supply the collected liquid to the liquid directing means, after a predetermined quantity thereof has been collected, whereby said collected liquid will be directly returned to the chamber by said directing means, preventing said collected liquid from becoming mixed with the body of liquid constituting the liquid supply.

3. A vaporizing device comprising a vaporizing chamber having a gas outlet, means to introduce a current of air into the chamber, whereby the flow thereof is directed out the outlet, a source of liquid supply, means to direct liquid into the chamber to be vaporized, means to collect liquid from the chamber and maintain the same separate from the source of liquid, and a valve in said collecting means for admitting said collected liquid to said source in the immediate zone of action of said directing means, whereby said collected liquid will be directly returned to the chamber by said directing means, preventing said collected liquid from becoming mixed with the body of liquid constituting the liquid supply.

4. A vaporizing device comprising a vaporizing chamber having a gas outlet, means to introduce a current of air into the chamber, whereby the flow thereof is directed out the outlet, a source of liquid supply, means to direct liquid into the chamber to be vaporized, means to collect liquid from the chamber and maintain the same separate from the source of liquid, and a valve in said collecting means actuated by the level of the liquid for admitting said collected liquid to said source in the immediate zone of action of said directing means, whereby said collected liquid will be directly returned to the chamber by said directing means, preventing said collected liquid from becoming mixed with the body of liquid constituting the liquid supply.

5. A vaporizing device comprising a vaporizing chamber having a gas outlet, means to introduce a current of air into the chamber, whereby the flow thereof is directed out the outlet, a collecting chamber, means to connect the collecting chamber to a source of liquid supply, a connection below said connecting means, to direct liquid from the collecting chamber into the vaporizing chamber, means to receive liquid from the vaporizing chamber and maintain the same separate from the liquid flowing from the source including a trap above the said collecting chamber and connected thereto, a float in the trap, a valve actuated by the float to control a communication between the trap and collecting chamber, and a pump in the first connection to return the collected fluid to the vaporizing chamber.

6. A vaporizing chamber including a manifold, a housing communicating with the manifold, a flow retarding device in the housing at one end thereof, an outlet pipe in the flow retarding end of the housing and coaxial therewith, an inwardly projecting housing in the first housing at the end distant from the flow retarding end and coaxial therewith, a baffle mounted at the inlet end of the outlet pipe overlying said inwardly projecting housing and concentric therewith, and a heating means in the second housing.

7. A vaporizing device comprising a vaporizing chamber having a gas outlet, means to introduce a current of air into the chamber, whereby the flow thereof is directed out the outlet, means to discharge liquid to be vaporized directly in the path of the air flow so as to form a mixture with said air while entering said chamber, a source of liquid serving said discharge means, and means for redirecting liquid from said chamber, to the immediate zone of action of said liquid discharge means, whereby said redirected liquid will be prevented from becoming mixed with the body of liquid constituting the liquid supply and returned to said chamber as soon as it is collected, to be finally vaporized.

8. A vaporizing device comprising a vaporizing chamber having a gas outlet, means to introduce a current of air into the chamber, whereby the flow thereof is directed out the outlet, means to discharge liquid to be vaporized directly in the path of the air flow so as to form a mixture with said air while entering said chamber, a local source of heat, heating the mixture within said chamber and assisting the vaporization of the liquid therein contained, a source of liquid serving said discharge means, and means for redirecting liquid from said chamber to the immediate zone of action of said liquid discharge means, whereby said redirected liquid will be prevented from becoming mixed with the body of liquid constituting the liquid supply and returned to said chamber as soon as it is collected, to be finally vaporized.

9. A vaporizing device comprising a vaporizing chamber having a gas outlet, means to introduce a current of air into the chamber, whereby the flow thereof is directed out the outlet, a suction pump to discharge liquid to be vaporized directly in the path of the air flow so as to form a mixture with said air while entering said chamber, a source of liquid serving the suction end of said pump, and a return line connecting said chamber to said suction end, whereby the unvaporized liquid in said chamber will be redirected to the immediate zone of action of said pump, so as to prevent said unvaporized liquid from becoming mixed with the body of liquid constituting the liquid supply, and return it to said chamber as soon as it is collected, to be finally vaporized.

10. A vaporizing device comprising a vaporizing chamber having a gas outlet, means to introduce a current of air into the chamber, whereby the flow thereof is directed out the outlet, a suction pump to discharge liquid to be vaporized directly in the path of the air flow so as to form a mixture with said air while entering said chamber, a local source of heat assisting the vaporization of the liquid therein contained, a source of liquid serving the suction end of said pump, and a return line connecting said chamber to said suction end, whereby the unvaporized liquid in said chamber will be redirected to the immediate zone of action of said pump, so as to prevent said unvaporized liquid from becoming mixed with the body of liquid constituting the liquid supply, and return it to said chamber as soon as it is collected, to be finally vaporized.

11. A vaporizing device comprising a vaporizing chamber, means for supplying a current of air to said chamber, means for supplying to said chamber liquid to be vaporized, heat generating means within said chamber for assisting the vaporization of said liquid, and means for recirculating through said chamber unvaporized liquid collected therefrom immediately as collected, without allowing it to become mixed with the body of liquid constituting the liquid supply, until said liquid is entirely vaporized.

12. A vaporizing device comprising a vaporizing chamber having an inlet and an outlet, a fan directing a current of air to said inlet, means for directing to said inlet, in the path of said air, liquid to be vaporized, a local source of heat assisting the vaporization of said liquid within said chamber, and means for redirecting to said liquid directing means unvaporized liquid from said chamber, to be immediately recirculated thereby.

13. A vaporizing device comprising a vaporizing chamber having an inlet and an outlet, a fan directing a current of air to said inlet, means for directing to said inlet, in the path of said air, liquid to be vaporized, a local source of heat assisting the vaporization of said liquid within said chamber, means for redirecting to said liquid directing means unvaporized liquid from said chamber, to be immediately recirculated thereby, and a porous partition at the inlet end of said chamber.

14. A vaporizing device comprising a vaporizing chamber having an inlet and an outlet, a fan directing a current of air to said inlet, means for directing to said inlet, in the path of said air, liquid to be vaporized, means for redirecting to said liquid directing means unvaporized liquid from said chamber, to be immediately recirculated thereby, and a porous partition at the inlet end of said chamber.

ALDO CURIONI.